United States Patent
Sakai

(10) Patent No.: US 10,317,869 B2
(45) Date of Patent: Jun. 11, 2019

(54) PLC MAINTENANCE SUPPORT DEVICE AND PLC MAINTENANCE SUPPORT PROGRAM

(71) Applicant: FANUC CORPORATION, Yamanashi (JP)

(72) Inventor: Yutaka Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 112 days.

(21) Appl. No.: 15/416,171

(22) Filed: Jan. 26, 2017

(65) Prior Publication Data

US 2017/0220019 A1   Aug. 3, 2017

(30) Foreign Application Priority Data

Jan. 29, 2016   (JP) .................. 2016-016563

(51) Int. Cl.
*G05B 19/05*   (2006.01)

(52) U.S. Cl.
CPC ......... *G05B 19/054* (2013.01); *G05B 19/056* (2013.01); *G05B 19/058* (2013.01); *G05B 2219/1105* (2013.01); *G05B 2219/13* (2013.01); *G05B 2219/13051* (2013.01); *G05B 2219/14006* (2013.01); *G05B 2219/15117* (2013.01); *G05B 2219/24163* (2013.01)

(58) Field of Classification Search
CPC .................. G05B 19/05; G05B 19/056; G05B 2219/13144; G05B 2219/2206; G05B 2219/24103; G05B 2219/25428; H04L 67/025; H04L 67/125
See application file for complete search history.

(56) References Cited

U.S. PATENT DOCUMENTS

| | | | | |
|---|---|---|---|---|
| 7,339,476 | B2* | 3/2008 | Macurek | G05B 19/4183 235/462.01 |
| 7,500,597 | B2* | 3/2009 | Mann | G06F 8/38 235/375 |
| 7,953,892 | B2* | 5/2011 | Kegoya | G05B 19/042 709/203 |
| 8,978,869 | B2* | 3/2015 | Schombert | B65G 47/1457 198/392 |
| 9,998,391 | B2* | 6/2018 | Farchmin | G05B 19/0423 |
| 2006/0066626 | A1* | 3/2006 | Kainuma | G05B 19/056 345/564 |

(Continued)

FOREIGN PATENT DOCUMENTS

| | | |
|---|---|---|
| CN | 102254201 A | 11/2011 |
| CN | 104573584 A | 4/2015 |

(Continued)

*Primary Examiner* — Crystal J Barnes-Bullock

(74) *Attorney, Agent, or Firm* — Hauptman Ham, LLP

(57) ABSTRACT

A PLC maintenance support device according to the present invention includes a signal identification tag reader for reading a signal address from a signal identification tag attached to an input and output signal cable of a PLC to identify the signal address of the input and output signal cable, a transmitter for transmitting the signal address identified by the signal identification tag reader to the PLC, a receiver for receiving the on or off state of a signal corresponding to the transmitted signal address from the PLC, and a monitor for displaying the received on or off state of the signal.

9 Claims, 8 Drawing Sheets

(56) References Cited

U.S. PATENT DOCUMENTS

| | | | |
|---|---|---|---|
| 2006/0095855 A1* | 5/2006 | Britt | G05B 19/042 |
| | | | 715/760 |
| 2006/0190624 A1* | 8/2006 | Kegoya | G05B 19/042 |
| | | | 709/246 |
| 2009/0237222 A1* | 9/2009 | Muirhead | B29C 51/02 |
| | | | 340/10.51 |
| 2011/0301721 A1* | 12/2011 | Sesay | G05B 19/05 |
| | | | 700/17 |

FOREIGN PATENT DOCUMENTS

| | | |
|---|---|---|
| CN | 204440500 U | 7/2015 |
| CN | 204463184 U | 7/2015 |
| CN | 105160370 A | 12/2015 |
| DE | 102008007230 A1 | 8/2008 |
| JP | 6-35512 | 2/1994 |
| JP | 3161487 B2 | 4/2001 |
| JP | 3713387 B2 | 11/2005 |
| JP | 2008-99407 A | 4/2006 |
| JP | 2006-331275 A | 12/2006 |
| JP | 2008-191874 A | 8/2008 |

\* cited by examiner

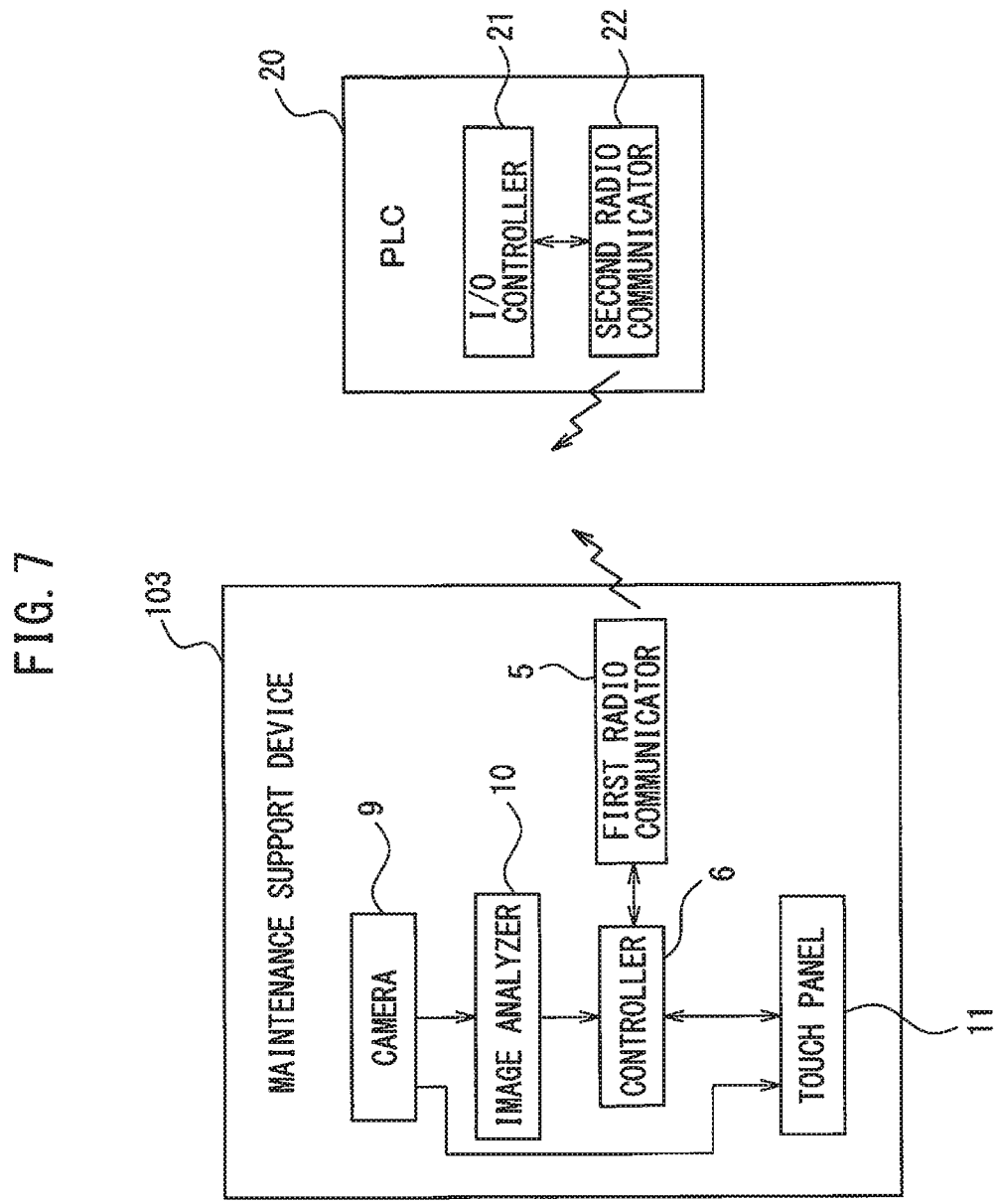

PLC MAINTENANCE SUPPORT DEVICE AND PLC MAINTENANCE SUPPORT PROGRAM

This application is a new U.S. patent application that claims benefit of JP 2016-016563 filed on Jan. 29, 2016, the content of JP 2016-016563 is incorporated herein by reference.

BACKGROUND OF THE INVENTION

1. Field of the Invention

The present invention relates to a PLC maintenance support device and a PLC maintenance support program, and more specifically relates to a PLC maintenance support device and a PLC maintenance support program used in an activation operation and a maintenance operation of a system including devices controlled by a PLC.

2. Description of Related Art

Systems that include devices (controlled devices) controlled by a programmable logic controller (PLC) sometimes cannot provide an expected operation. Therefore, to check the connection state of a signal cable, a method in which the voltage of a signal cable terminal connected to the controlled device is measured and compared with a value within the PLC is known (for example, Japanese Patent No. 3713387, hereinafter referred to as "patent document 1"). Also, as a part of the checking operation, a method in which while an output signal of the PLC is temporarily and forcefully turned on or off, the operation of the controlled device is checked, is known (for example, Japanese Patent No. 3161487, hereinafter referred to as "patent document 2").

In a general method, the signal name of a signal cable the connection state of which is desired to be checked is identified from a mark tube having the signal name printed thereon, and the PLC displays a screen showing the state of the signal. Next, the voltage of the signal is measured by a tester, and compared with the state (on or off) of the signal in the PLC. Furthermore, as for an output signal, while the signal is temporarily and forcefully turned on or off by operating the PLC, an operation result is checked. This checking operation must be performed a number of times in order to check signals one by one, until an expected operation is obtained, thus causing a deterioration in efficiency.

Patent documents 1 and 2 disclose devices that improve efficiency in the connection checking operation of the PLC. However, the inventions of these documents cannot check the connections of input signals. Also, as for output signals, the connections of the output signals cannot be checked, unless the correspondences between signal assignments of the PLC and the devices connected through the cables are identified beforehand.

SUMMARY OF THE INVENTION

An object of the present invention is to provide a PLC maintenance support device and a PLC maintenance support program that can quickly and easily determine whether input and output signals of a PLC each have a value indicating an on state or an off state at present within the PLC, during operation of controlled devices.

A PLC maintenance support device according to an embodiment of the present invention includes a signal identification tag reader for reading a signal address from a signal identification tag attached to an input and output signal cable of a PLC to identify the signal address of the input and output signal cable, a transmitter for transmitting the signal address identified by the signal identification tag reader to the PLC, a receiver for receiving the on or off state of a signal corresponding to the transmitted signal address from the PLC, and a monitor for displaying the received on or off state of the signal.

A PLC maintenance support program according to an embodiment of the present invention includes the steps of reading a signal address from a signal identification tag attached to an input and output signal cable of a PLC to identify the signal address of the input and output signal cable, transmitting the identified signal address to the PLC, receiving the on or off state of a signal corresponding to the transmitted signal address from the PLC, and displaying the received on or off state of the signal.

BRIEF DESCRIPTION OF THE DRAWINGS

The objects, features, and advantages of the present invention will be more apparent from the following description of embodiments in conjunction with the attached drawings, wherein:

FIG. 7 is a block diagram of the PLC maintenance support device according to the third embodiment of the present invention.

DETAILED DESCRIPTION OF THE INVENTION

A programmable logic controller (PLC) maintenance support device and a PLC maintenance support program according to the present invention will be described below with reference to the drawings.

[First Embodiment]

Figure 1:
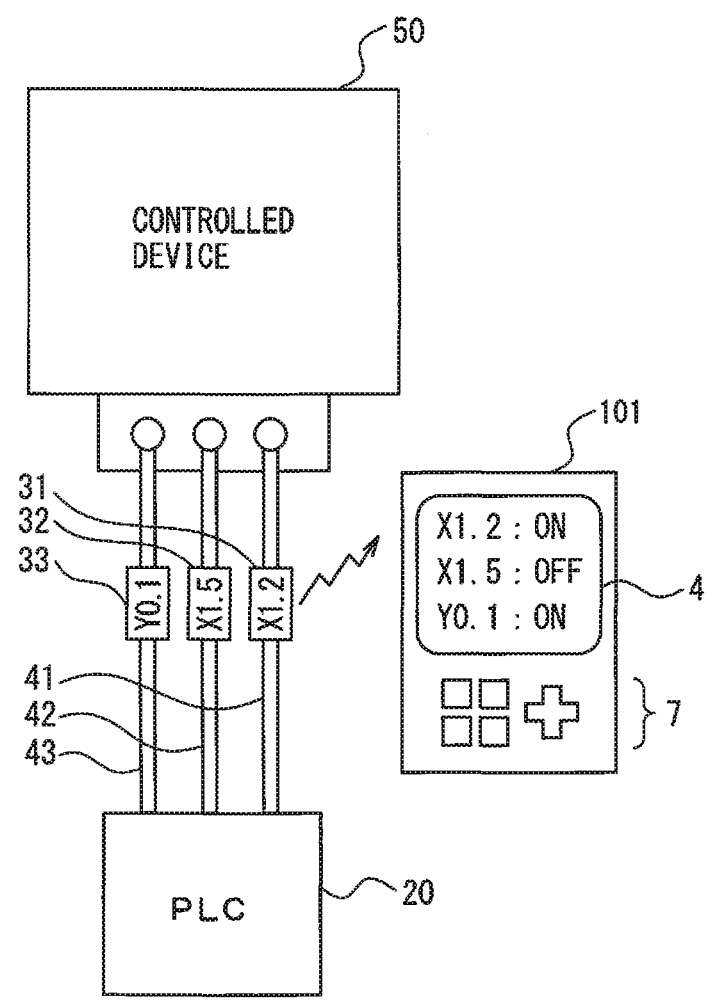
FIG. 1 is a configuration diagram of a PLC maintenance support system including a PLC maintenance support device according to a first embodiment of the present invention.

A PLC maintenance support device according to a first embodiment of the present invention will be first described. FIG. 1 is a configuration diagram of a PLC maintenance support system including the PLC maintenance support device according to the first embodiment of the present invention. FIG. 1 shows an example in which a PLC 20 and a device (hereinafter referred to as "controlled device") 50 controlled by the PLC 20 are connected through three input and output (I/O) signal cables, that is, a first input and output signal cable 41, a second input and output signal cable 42, and a third input and output signal cable 43. However, the number of the input and output signal cables is not limited to three, but may be two or four or more.

First to third signal identification tags 31 to 33 are attached to the first to third input and output signal cables 41 to 43, respectively. The number of the signal identification tags is three, i.e., the same as the number of the input and output signal cables in this embodiment, but is not limited thereto. The number of the signal identification tags may be two or four or more, according to the number of the input and output signal cables.

A maintenance support device 101 emits a radio wave. When the maintenance support device 101 gets near the first to third signal identification tags 31 to 33 within a certain distance range, the radio wave emitted from the maintenance support device 101 makes each of the first to third signal identification tags 31 to 33 generate a small amount of electric power. By the electric power, a radio wave signal including information about a signal address is transmitted. The maintenance support device 101 reads the radio wave signal to obtain the information about the signal address of each of the first to third signal identification tags 31 to 33.

The maintenance support device 101 displays the signal addresses obtained from the information on the first to third signal identification tags 31 to 33, and the present states of signals indicated by the signal addresses within the PLC 20, on a monitor 4 of the maintenance support device 101. By way of example, the signal addresses of the first to third signal identification tags 31 to 33 are "X1.2", "X1.5", and "Y0.1", respectively. In this case, if the present states of the signals are "ON", "OFF", and "ON" within the PLC 20, respectively, as shown in FIG. 1, the signal addresses and the signal states are represented as "X1.2:ON", "X1.5: OFF", and "Y0.1: ON" on the monitor 4. Note that, the signal addresses and the signal states are displayed on the monitor 4 by an operation by a user on an operation unit 7.

Furthermore, it is predetermined that "X☐☐☐" indicates an address of an input signal inputted from the controlled device 50 to the PLC 20, and "Y☐☐☐" indicates an address of an output signal outputted from the PLC 20 to the controlled device 50. This predetermination allows for determining whether a signal transmitting through the input and output signal cable is an input signal or an output signal based on its signal address.

Figure 2:
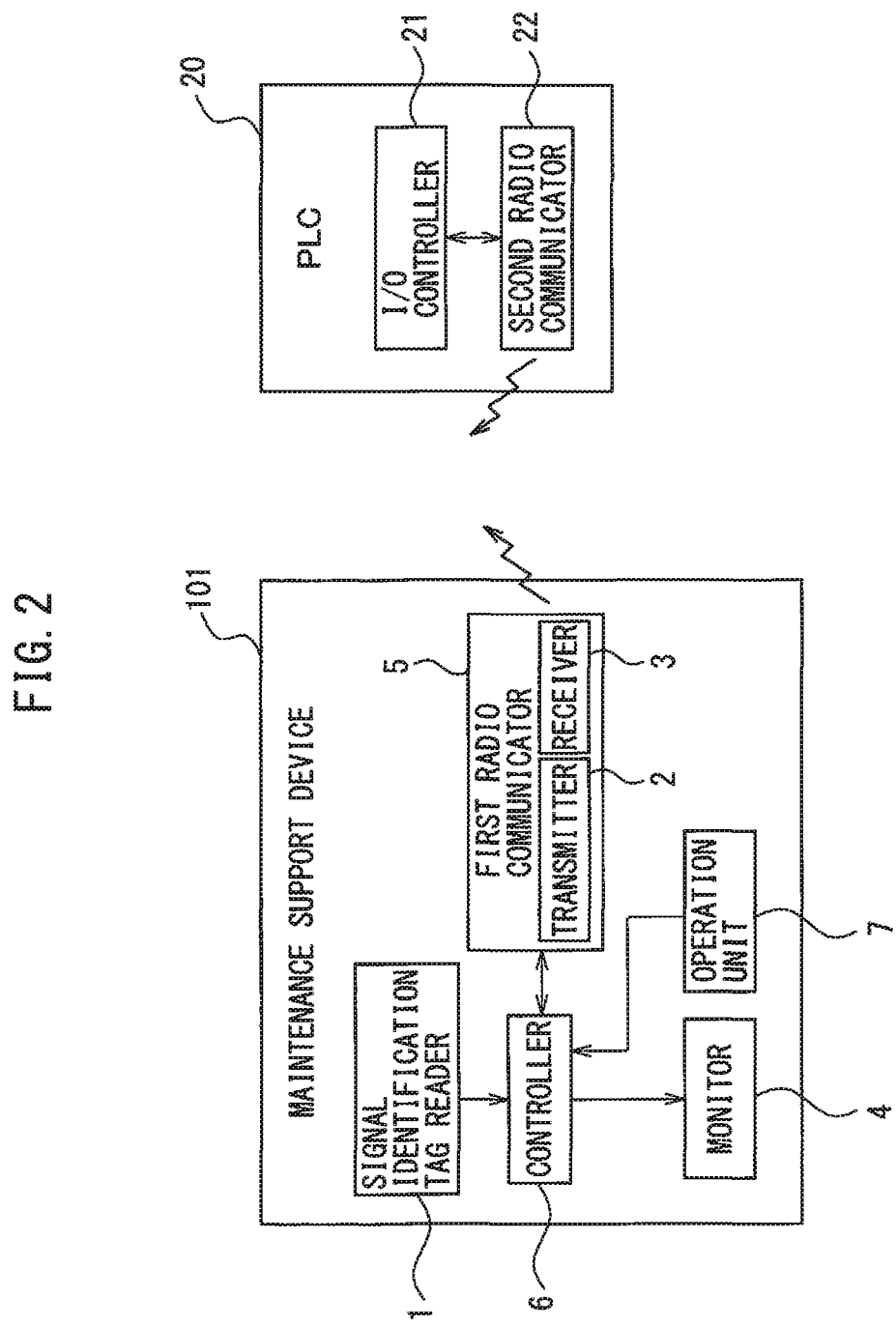
FIG. 2 is a block diagram of the PLC, maintenance support device according to the first, embodiment of the present invention.

Next, the configuration of the PLC maintenance support device according to the first embodiment of the present invention will be described. FIG. 2 is a block diagram of the PLC maintenance support device according to the first embodiment of the present invention. The maintenance support device 101 includes a signal identification tag reader 1, a transmitter 2, a receiver 3, and the monitor 4. The maintenance support device 101 further includes a first radio communicator 5, a controller 6, and the operation unit 7. The first radio communicator 5 may include the transmitter 2 and the receiver 3. The maintenance support device 101 is communicatable with the PLC 20 through the first radio communicator 5.

The signal identification tag reader 1 reads the signal address from each of the first to third signal identification tags 31 to 33 attached to the first to third input and output signal cables 41 to 13 of the PLC 20, to identify the signal address of each of the first to third input and output signal cables 41 to 43.

The transmitter 2 transmits the signal addresses identified by the signal identification tag reader 1 to the PLC 20. The receiver 3 receives the on/off state of each of signals corresponding to the transmitted signal addresses from the PLC 20.

The monitor 4 displays the on/off states of the received signals. FIG. 1 shows a display example on the monitor 4.

When the maintenance support device 101 gets near the first to third signal identification tags 31 to 33 attached to the first to third input and output signal cables 41 to 43 (see FIG. 1) within the certain distance range, the signal identification tag reader 1 communicates with the first to third signal identification tags 31 to 33 to obtain the signal address of each of the first to third input and output signal cables 41 to 43. The signal identification tag reader 1 transmits the obtained signal addresses to the controller 6.

The controller 6 inquires of the PLC 20 through the first radio communicator 5 about the present on/off state of the signal indicated by each of the signal addresses obtained from the first to third signal identification tags 31 to 33. The controller 6 also transmits a command from the operation unit 7. The controller 6 also commands display on the monitor 4.

An I/O controller 21 of the PLC 20 determines the states of the signals about which the maintenance support device 101 has inquired through a second radio communicator 22. After that, the PLC 20 informs the maintenance support device 101 through the second radio communicator 22 of the signal states. Also, the I/O controller 21 can control the on/off operation of an output signal in accordance with a command received through the second radio communicator 22.

Figure 3:
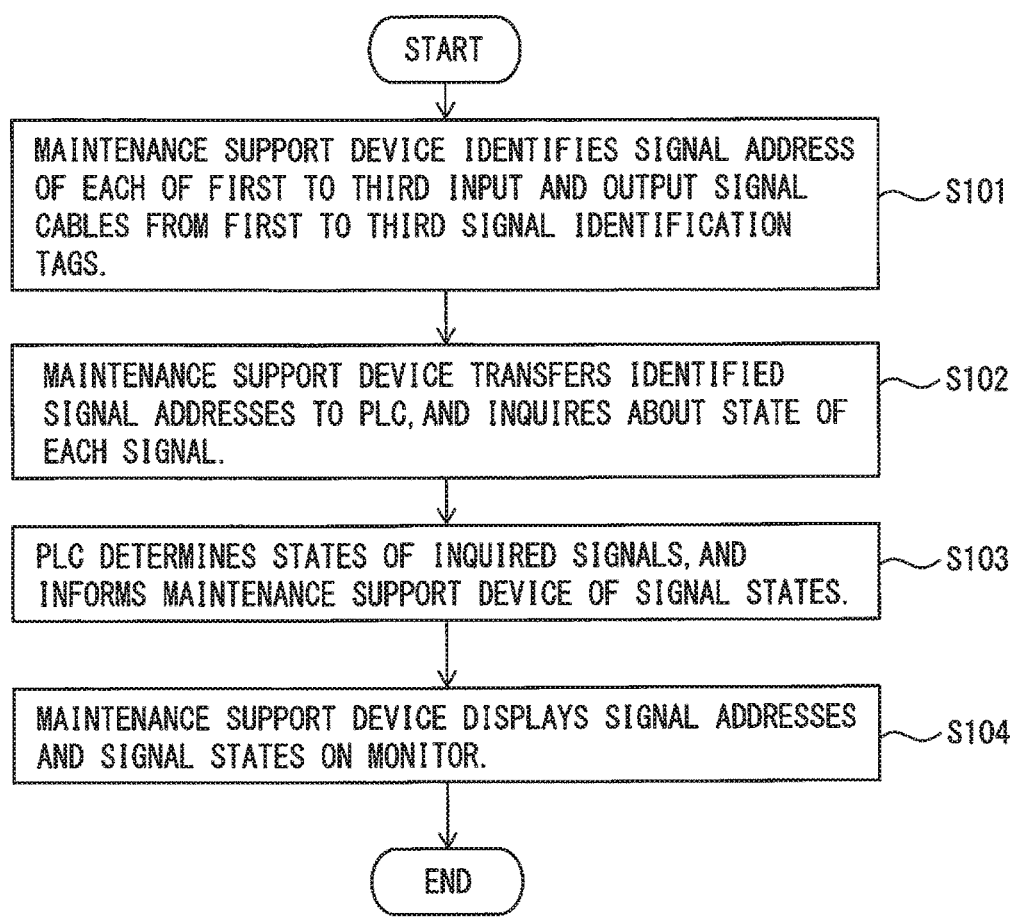
FIG. 3 is a flowchart, of the operation of a PLC maintenance support program according to the first embodiment of the present invention.

Next, a PLC maintenance support program according to the first embodiment of the present invention will be described. FIG. 3 is a flowchart of the operation of the PLC maintenance support program according to the first embodiment of the present invention. First, in step S101, the maintenance support device 101 identifies a signal address of each of the first to third input and output signal cables 41 to 43 from the first to third signal identification tags 31 to 33. In other words, the maintenance support device 101 reads the signal address from each of the first to third signal identification tags 31 to 33 attached to the first to third input and output signal cables 41 to 43 of the PLC 20, to identify the signal address of each of the first to third input and output signal cables 41 to 43.

Next, in step S102, the maintenance support device 101 transfers the identified addresses to the PLC 20, and inquires of the PLC 20 about the state of each signal. More specifically, the transmitter 2 of the maintenance support device 101 transmits the identified signal addresses to the PLC 20.

Next, in step S103, the PLC 20 determines the state of each signal, and informs the maintenance support device 101 of the signal state. That is, the maintenance support device 101 receives information about the on/off states of the signals corresponding to the transmitted signal addresses at the receiver 3 from the PLC 20.

Next, in step S104, the maintenance support device 101 displays the signal addresses and the signal states on the monitor 4. That is, the monitor 4 displays the received on/off states of the signals.

The PLC maintenance support program according to the first embodiment of the present invention is preferably provided as a downloadable application.

As described above, the PLC maintenance support device and the PLC maintenance support program according to the first embodiment of the present invention can quickly and easily determine whether the input and output signals of the PLC each have a value indicating an on state or an off state at present within the PLC, during operation of the controlled device.

[Second Embodiment]

Figure 4:
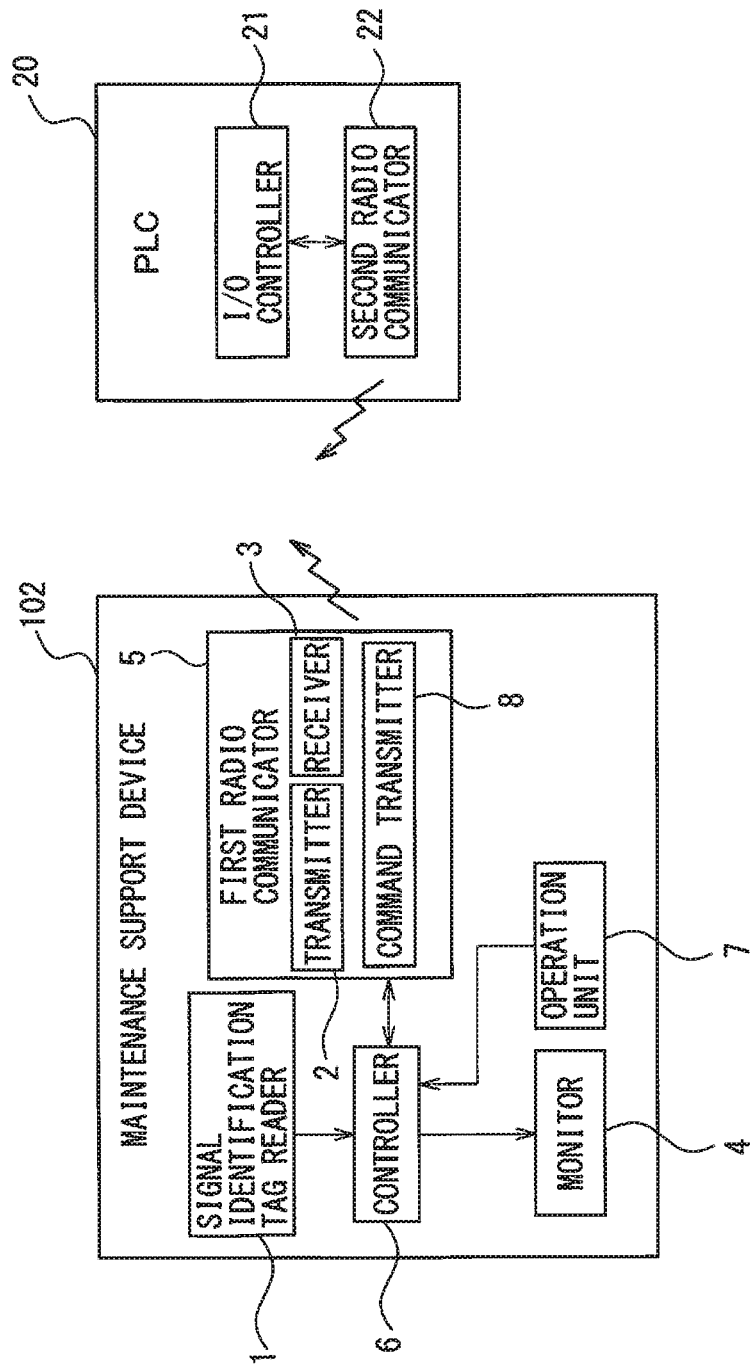
FIG. 4 is a block diagram of a PLC maintenance support device according to a second embodiment of the present invention.

Next, a PLC maintenance support device and a PLC maintenance support program according to a second embodiment of the present invention will be described. FIG. 4 is a block diagram of the PLC maintenance support device according to the second embodiment of the present invention. The difference between a PLC maintenance support device 102 according to the second embodiment and the PLC maintenance support device 101 (see FIG. 2) according to the first embodiment is that the PLC maintenance support device 102 further includes a command transmitter 8. When the signals the on/off states of which are displayed on the monitor 4 include an output signal, the command transmitter 8 transmits a command to turn on or off the output signal to the PLC 20. The other configuration of the maintenance support device 102 according to the second embodiment of the present invention is the same as that of the maintenance support device 101 according to the first embodiment, so a detailed description thereof is omitted.

When the signals read from the first to third signal identification tags 31 to 33 (see FIG. 1) include an output signal, a user can command whether to turn on or off the output signal from the operation unit 7. When a command to turn on or off the output signal is issued from the operation unit 7, the command transmitter 8 of the maintenance support device 102 transfers the address of the output signal to the PLC 20, and commands the PLC 20 to turn on or off the output signal. Upon receiving the command, the PLC 20 controls the on/off operation of the commanded signal.

The command transmitter 8 is disposed in the first radio communicator 5 in the example of FIG. 4, but is not limited thereto. The command transmitter 8 may be disposed outside the first radio communicator 5.

Figure 5:
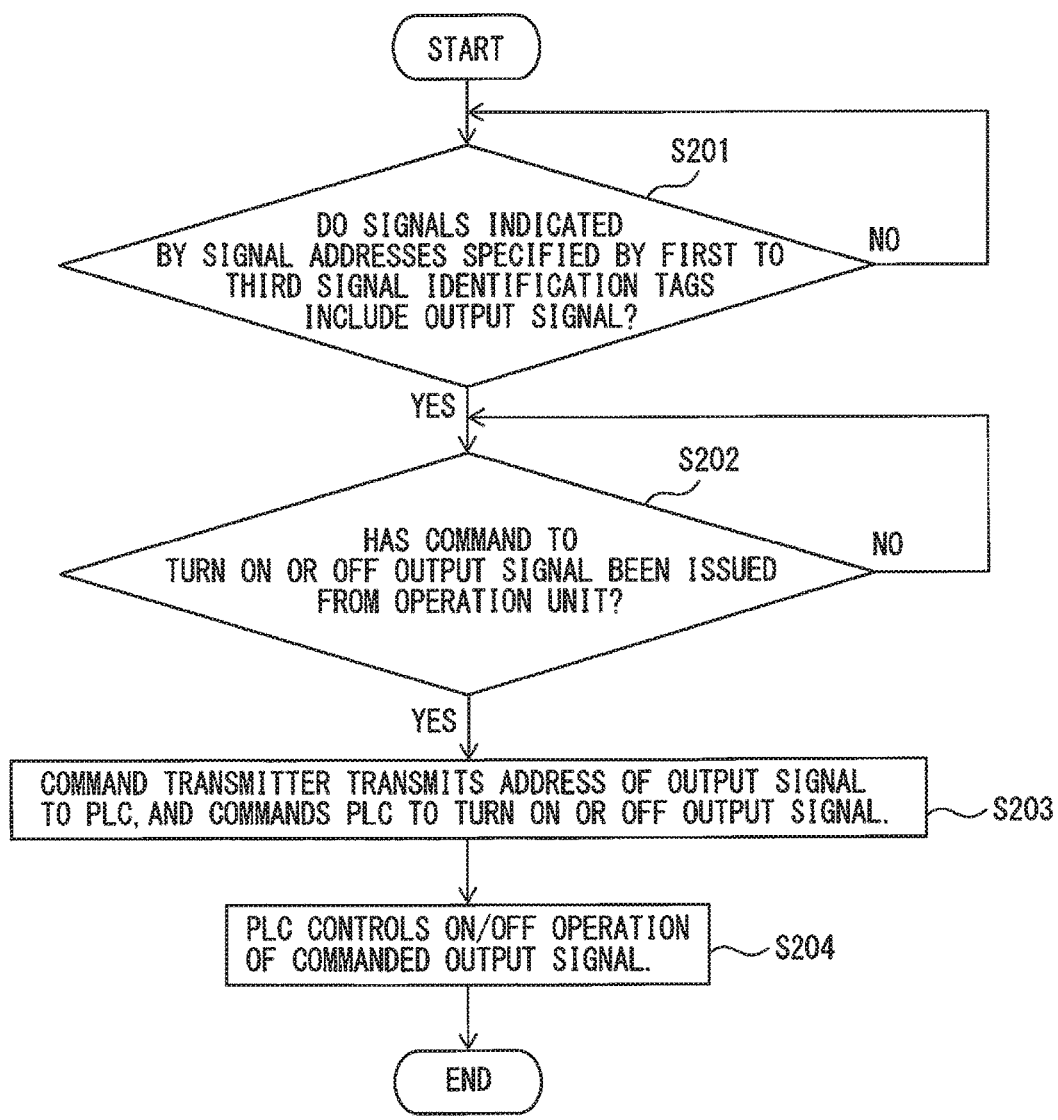
FIG. 5 is a flowchart of the operation of a PLC maintenance support program according to the second embodiment of the present invention.

Next, the PLC maintenance support program according to the second embodiment of the present invention will be described. FIG. 5 is a flowchart of the operation of the PLC maintenance support program according to the second embodiment of the present invention. First, in step S201, the controller 6 determines whether or not signals indicated by signal addresses specified by the first to third signal identification tags 31 to 33 include an output signal. Note that, the monitor 4 displays whether the signals indicated by the signal addresses specified by the first to third signal identification tags 31 to 33 each have an on state or an off state. When the signals indicated by the specified signal addresses include no output signal, the operation returns to step S201, and the above determination step is repeated when signals are updated.

When the signals indicated by the specified signal addresses include an output signal, in step S202, the controller 6 determines whether or not a command to turn on or off the output signal has been issued from the operation unit 7. When no command is issued from the operation unit 7, the operation returns to step S202 to wait for a command to turn on or off the output signal.

When a command to turn on or off the output signal has been issued from the operation unit 7, in step S203, the maintenance support device 102 transmits the address of the output signal to the PLC 20, and commands the PLC 20 to turn on or off the output signal.

Next, in step S204, the PLC 20 controls the on/off operation of the commanded output signal.

The PLC maintenance support program according to the second embodiment of the present invention is preferably provided as a downloadable application.

As described above, the PLC maintenance support device and the PLC maintenance support program according to the second embodiment of the present invention can quickly and easily control the temporary on/off operation of the output signal of the PLC, during operation of the controlled device.

[Third Embodiment]

Figure 6A:
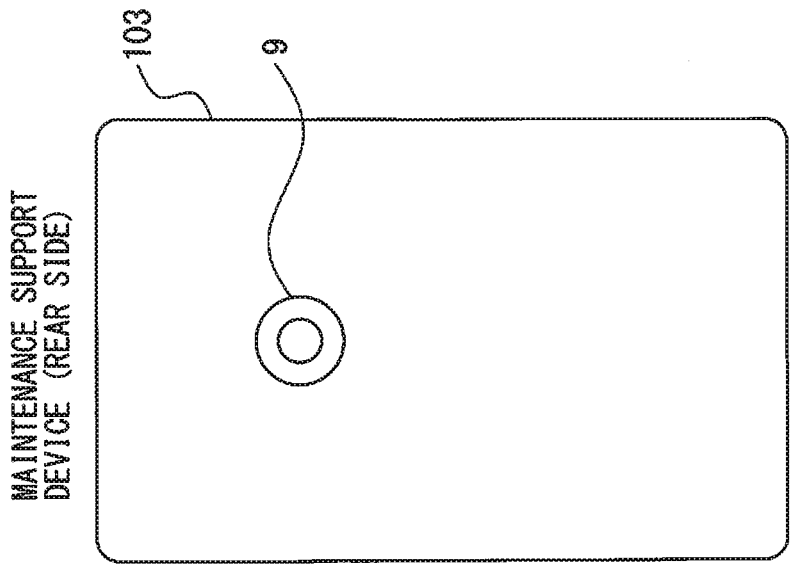
FIG. 6A is an external view of a front side of a PLC maintenance support device according to a third embodiment of the present invention.
Figure 6B:
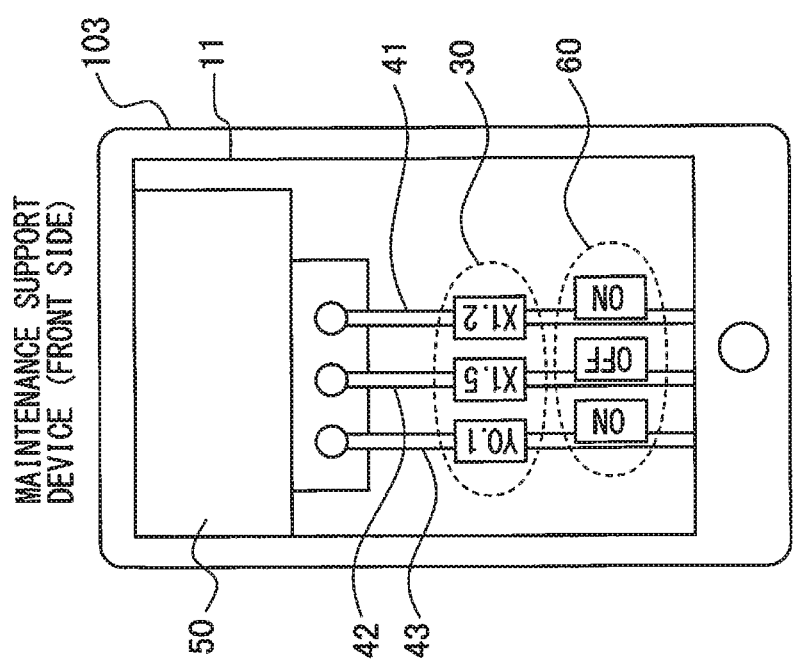
FIG. 6B is an external view of a rear side of the PLC maintenance support device according to the third embodiment of the present invention.

Next, a PLC maintenance support device according to a third embodiment, of the present invention will be described. FIG. 6A is an external view of a front side of a PLC maintenance support device 103 according to the third embodiment of the present invention. FIG. 6B is an external view of a rear side of the PLC maintenance support device 103 according to the third embodiment of the present invention.

The maintenance support device 103 is provided with a touch panel 11 on its front side, and a camera 9 on its rear side. The camera 9 is directed to the first to third input and output signal cables 41 to 13 connected to the device 50 controlled by the PLC 20, as shown in FIG. 1, to capture an image. However, the signal identification tags are not necessarily attached to the first to third input and output signal cables 41 to 43, but mark tubes 30 having signal addresses printed thereon are adequate.

As shown in FIG. 6A, the image captured by the camera 9 is displayed on the touch panel 11. Marks 60 of "ON" or "OFF" that indicate the state of each signal within the PLC 20 are displayed in the vicinity of the displayed mark tubes 30 in such a manner as to be overlaid on the captured image. Also, when the signals displayed on a screen of the touch panel 11 include an output signal, the level of the output signal can be inverted from a current value, that is, from "ON" to "OFF" or from "OFF" to "ON", by tapping the image of the mark tube 30 on the touch panel 11.

As the maintenance support device 103, for example, a portable device such as a smart phone is usable.

Next, the configuration of the PLC maintenance support device according to the third embodiment of the present invention will be described. FIG. 7 is a block diagram of the maintenance support device 103 according to the third embodiment of the present invention. The maintenance support device 103 includes the camera 9, an image analyzer 10, a controller 6, a first radio communicator 5, and the touch panel 11. The maintenance support device 103 is communicatable with the PLC 20 through the first radio communicator 5. An image captured by the camera 9 is transmitted to the touch panel 11 and displayed on the screen. The image is also transmitted to the image analyzer 10. When the image analyzer 10 has recognized an object the shape of which coincides with the shape of the mark tube 30 stored in advance, the image analyzer 10 reads a printed signal address and transmits the signal address to the controller 6. The controller 6 inquires of the PLC 20 through the first radio communicator 5 about the current on/off state of a signal indicated by the signal address obtained by the image analyzer 10. An I/O controller 21 of the PLC 20 informs the maintenance support device 103 through a second radio communicator 22 of information about the state of the inquired signal. The controller 6 of the maintenance support device 103 receives the information about the signal state, and displays the mark 60 indicating the signal state on the touch panel 11 in the vicinity of the mark tube 30 of the signal such a manner as to be overlaid on the image of each of the first to third input and output signal cables 41 to 43.

Also, when the signals displayed on the touch panel 11 include an output signal, upon a user's tapping on the image of the mark tube 30 on the touch panel 11, the touch panel 11 issues a command to invert the value of the signal to the controller 6. The controller 6 transmits the command to the PLC 20 through the first radio communicator 5. Upon receiving the command, the I/O controller 21 of the PLC 20 halts a sequential program and inverts the value of the commanded signal from a current value.

A PLC maintenance support program for operating the PLC maintenance support device according to the third embodiment of the present invention is preferably provided as a downloadable application.

According to the maintenance support device of the third embodiment of the present invention, tapping the image of the mark tube on the touch panel switches the output signal between an on state and an off state, thus allowing for quickly and easily controlling the on/off operation of the output signal from the PLC.

[Fourth Embodiment]

Figure 8:
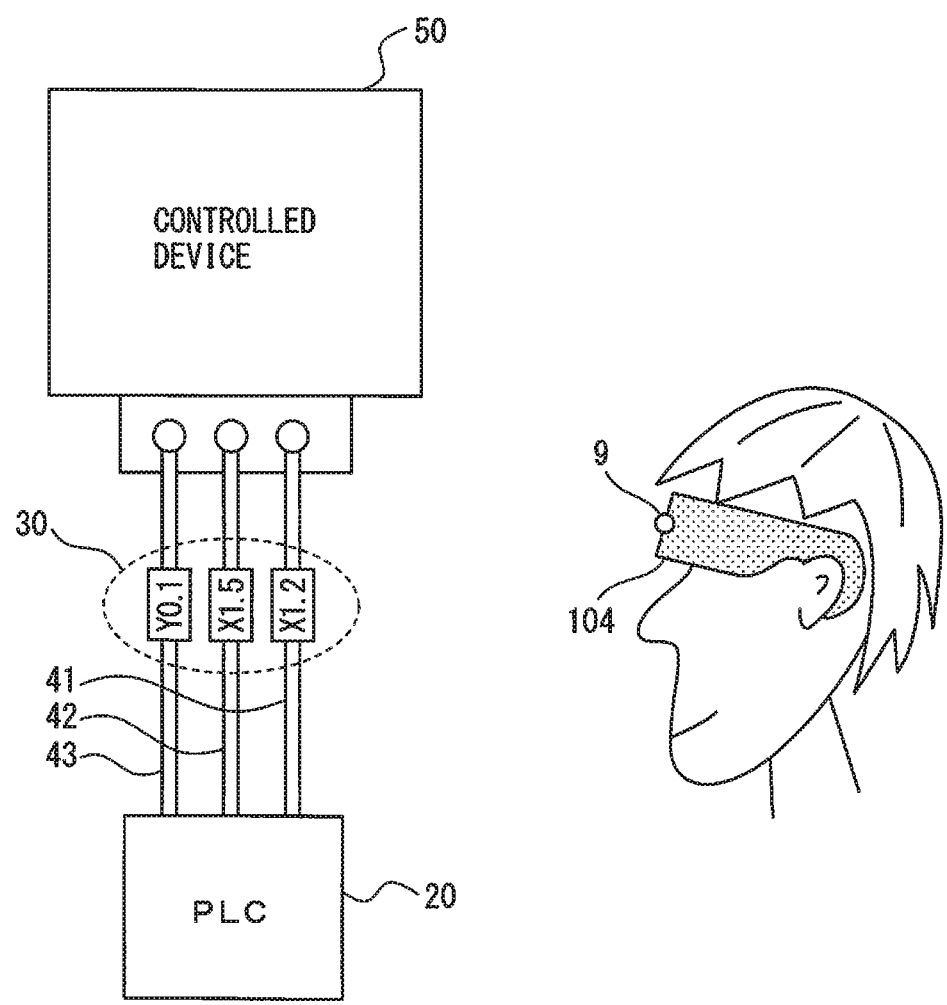
FIG. 8 is a configuration diagram of a PLC maintenance support system including a PLC maintenance support device according to a fourth embodiment of the present invention.

Next, a PLC maintenance support device according to a fourth embodiment of the present invention will be described. FIG. 8 is a configuration diagram of a PLC maintenance support system including a PLC maintenance support device 104 according to the fourth embodiment of the present invention. The maintenance support device 104 takes the form of a head mount display (HMD). An image captured by a camera 9 provided outside the maintenance support device 104 is displayed on an internal screen (not shown) of the maintenance support device 104. The signal names of the mark tubes 30 are read from the image and the signal states inquired of the PLC 20 are overlaid on the image in the same manner as in the maintenance support device 103 according to the third embodiment. Although a method for commanding to invert the value of an output signal is not described in detail, a user may actually tap the mark tube of the output signal and the tapping operation may be recognized by motion capture.

Also, the present invention may be combined with a programmable device that is portable and connectable to the PLC. This results in a further increase in convenience.

According to the PLC maintenance support device of the fourth embodiment of the present invention, the image of the mark tubes is displayed on the HMD, and tapping the mark tube on the image switches the output signal between an on state and an off state, thus allowing quickly and easily controlling the on/off operation of the output signal from the PLC.

The PLC maintenance support device and the PLC maintenance support program according to the embodiments of the present invention can quickly and easily determine whether the input and output signals of the PLC each have a value indicating an on state or an off state at present within the PLC, during operation of the controlled device.

What is claimed is:

1. A PLC (Programmable Logic Controller) maintenance support device comprising:
   a signal identification tag reader for reading a signal address from a signal identification tag attached to an input and output signal cable of a PLC to identify the signal address of the input and output signal cable;
   a transmitter for transmitting the signal address identified by the signal identification tag reader to the PLC;
   a receiver for receiving the on or off state of a signal corresponding to the transmitted signal address from the PLC; and
   a monitor for displaying the received on or off state of the signal.

2. The PLC maintenance support device according to claim 1, further comprising
   a command transmitter, when the signal the on or off state of which is displayed on the monitor is an output signal, for transmitting a command to turn on or of the output signal to the PLC.

3. The PLC maintenance support device according to claim 1, further comprising:
   a first radio communicator,
   wherein the first radio communicator includes at least the transmitter and the receiver.

4. The PLC maintenance support device according to claim 1, further comprising:
   a camera configured to capture an image of the signal identification tag which is a mark tube having the signal address printed thereon; and
   an image analyzer configured to recognize, from the image, the mark tube and then read the signal address printed on the recognized mark tube,
   wherein the image analyzer is configured to recognize the mark tube based on a previously stored shape of the mark tube,
   wherein the transmitter is configured to transmit the printed signal address read by the image analyzer to the PLC, and
   wherein the receiver is configured to receive, from the PLC, the on or off state of the signal corresponding to the transmitted printed signal address.

5. A PLC maintenance support program comprising the steps of:
   reading a signal address from a signal identification tag attached to an input and output signal cable of a PLC to identify the signal address of the input and output signal cable;
   transmitting the identified signal address to the PLC;
   receiving the on or off state of a signal corresponding to the transmitted signal address from the PLC; and
   displaying the received on or off state of the signal.

6. The PLC maintenance support program according to claim 5, further comprising
   the step of, when the signal the on or off state of which is displayed is an output signal, transmitting a command to turn on or off the output signal to the PLC.

7. A system, comprising:
   a PLC (Programmable Logic Controller);
   a PLC maintenance support device;
   an input and output signal cable of the PLC; and
   a signal identification tag attached to the signal cable,
   wherein the PLC is configured to control a controlled device through the signal cable coupled between the PLC and the controlled device,
   wherein the signal identification tag carries a signal address of the signal cable,
   wherein the PLC maintenance support device comprises:
      a signal identification tag reader configured to read the signal address from the signal identification tag attached to the signal cable to identify the signal address of the signal cable, and
      a first transmitter configured to transmit, to the PLC, the signal address identified by the signal identification tag reader,
      a first receiver, and
      a monitor,
   wherein the PLC comprises:

a second receiver configured to receive the signal address identified by the signal identification tag reader and transmitted from the first transmitter of the PLC maintenance support device, and a second transmitter configured to transmit, to the PLC maintenance support device, an on or off state of a signal corresponding to the signal address received at the second receiver, and wherein the first receiver of the PLC maintenance support device is configured to receive, from the PLC, the on or off state of the signal corresponding to the signal address, and the monitor of the PLC maintenance support device is configured to display (i) the signal address together with (ii) the received on or off state of the signal corresponding to the signal address.

8. The system according to claim 7, wherein the signal the on or off state of which is displayed on the monitor is an output signal, and the PLC maintenance support device further comprises a command transmitter configured to transmit, to the PLC, a command to cause the PLC to turn on or of the output signal.

9. The system according to claim 7, wherein the signal identification tag reader includes a camera configured to capture an image of the signal identification tag which is a mark tube having the signal address printed thereon, the PLC maintenance support device further comprises an image analyzer configured to recognize, from the image, the mark tube and then read the signal address printed on the recognized mark tube, the image analyzer is configured to recognize the mark tube based on a previously stored shape of the mark tube, the first transmitter is configured to transmit the printed signal address read by the image analyzer to the PLC, and the first receiver is configured to receive, from the PLC, the on or off state of the signal corresponding to the transmitted printed signal address.

\* \* \* \* \*